(12) United States Patent
Chelaidite et al.

(10) Patent No.: US 10,443,666 B2
(45) Date of Patent: Oct. 15, 2019

(54) TORQUE TRANSFERRING ASSEMBLY FOR A BRAKE ASSEMBLY

(71) Applicant: Akebono Brake Industry Co., Ltd., Chuo-ku, Tokyo (JP)

(72) Inventors: Galus Chelaidite, South Lyon, MI (US); Michio Suzuki, Walled Lake, MI (US)

(73) Assignee: Akebono Brake Industry Co., Ltd., Chuo-ku, Tokyo (JP)

(*) Notice: Subject to any disclaimer, the term of this patent is extended or adjusted under 35 U.S.C. 154(b) by 0 days.

(21) Appl. No.: 15/804,196

(22) Filed: Nov. 6, 2017

(65) Prior Publication Data
US 2018/0135711 A1 May 17, 2018

Related U.S. Application Data

(60) Provisional application No. 62/420,711, filed on Nov. 11, 2016, provisional application No. 62/466,413, filed on Mar. 3, 2017.

(51) Int. Cl.
*F16D 65/18* (2006.01)
*F16D 125/36* (2012.01)
(Continued)

(52) U.S. Cl.
CPC .......... *F16D 65/18* (2013.01); *F16D 2121/04* (2013.01); *F16D 2121/24* (2013.01); *F16D 2125/36* (2013.01)

(58) Field of Classification Search
CPC ...... F16D 65/18; F16D 65/183; F16D 55/226; F16D 2121/04; F16D 2121/24; F16D 2125/36; F16D 2125/48; F16D 2125/52
(Continued)

(56) References Cited

U.S. PATENT DOCUMENTS 3,809,191 A * 5/1974 Woodward ............ B60T 13/741
188/106 A
6,433,451 B1 8/2002 Cherciu
(Continued)

FOREIGN PATENT DOCUMENTS

WO 2008/065647 A1 6/2008

OTHER PUBLICATIONS

European Search Report for European Application No. 17200801, dated Apr. 12, 2018.

*Primary Examiner* — Robert A. Siconolfi
*Assistant Examiner* — San M Aung
(74) *Attorney, Agent, or Firm* — The Dobrusin Law Firm, P.C.

(57) ABSTRACT

A torque transferring assembly that includes: a first output; a second output; and a spider located in between the first output and the second output. The spider is adapted to support a plurality of torque transferring elements such that each of the torque transferring elements are in communication with both of the first output and the second output. The torque transferring assembly is adapted to supply a torque to both the first output and the second output so that both outputs rotate together until a load or resistance acting on the first output becomes higher than a load or resistance acting on the second output. The torque transferring assembly is then adapted to transfer the torque to the second output so that the first output slows or ceases to rotate, while the second output continues to rotate.

20 Claims, 8 Drawing Sheets

(51) Int. Cl.
*F16D 121/24* (2012.01)
*F16D 121/04* (2012.01)

(58) Field of Classification Search
USPC .......................................................... 188/72.6
See application file for complete search history.

(56) References Cited

U.S. PATENT DOCUMENTS

| | | |
|---|---|---|
| 7,262,533 B2 | 8/2007 | Fiset |
| 9,276,453 B2 | 3/2016 | Galvan |
| 2013/0087422 A1* | 4/2013 | Park ........................ F16D 65/22 188/325 |
| 2015/0129371 A1* | 5/2015 | Gutelius ................. F16D 65/18 188/72.6 |
| 2015/0204402 A1* | 7/2015 | Gutelius ................. F16D 65/14 188/162 |
| 2016/0290424 A1* | 10/2016 | Gutelius ................. F16D 65/18 |

* cited by examiner

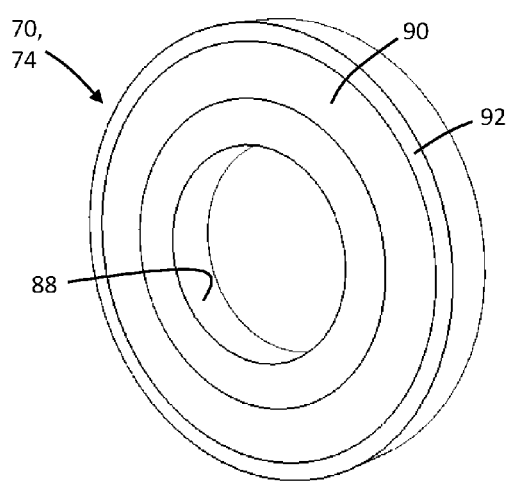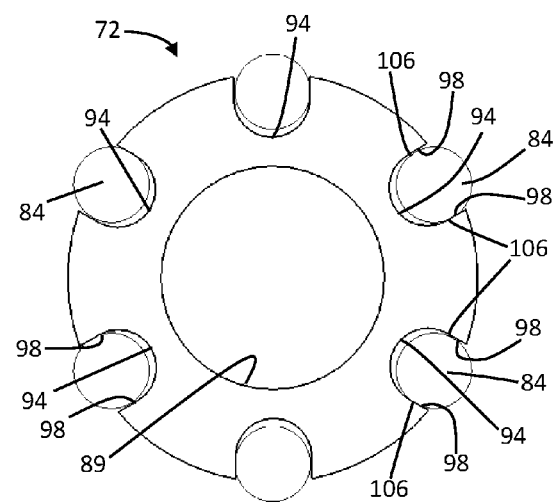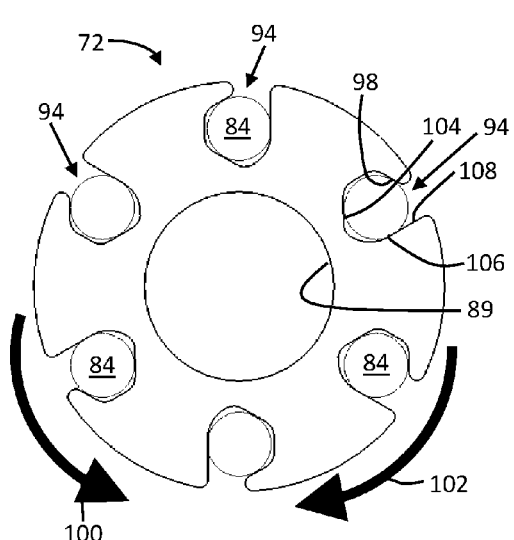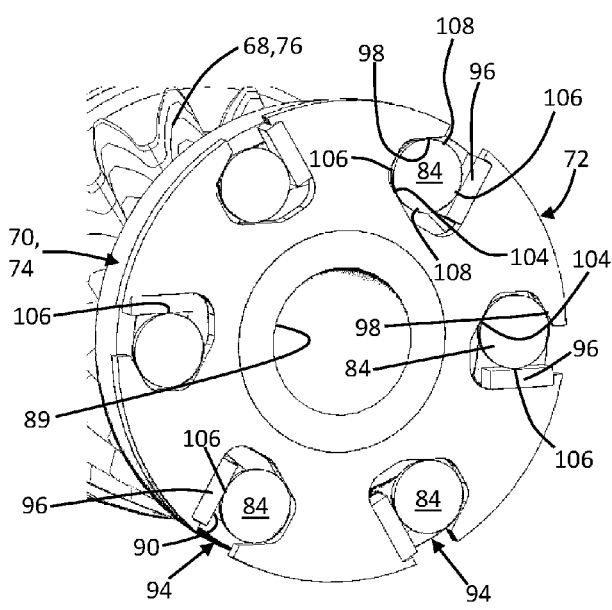

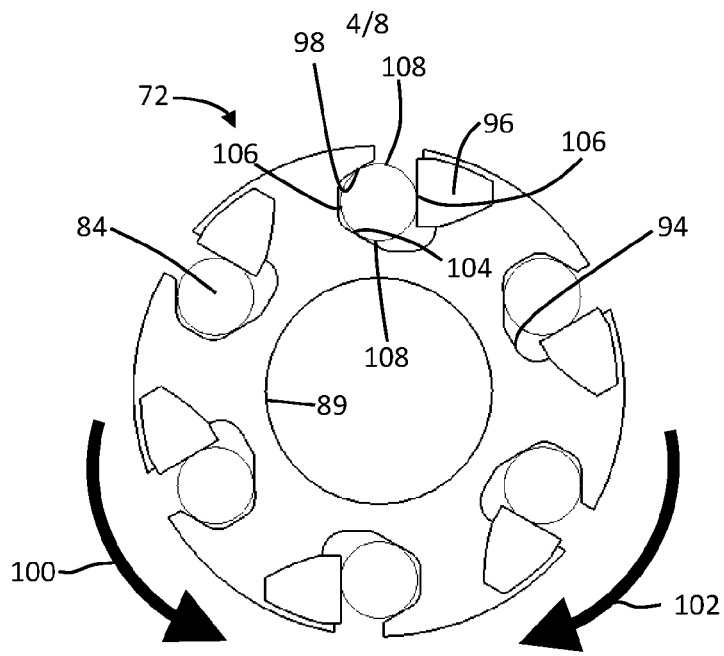
Fig. 8a
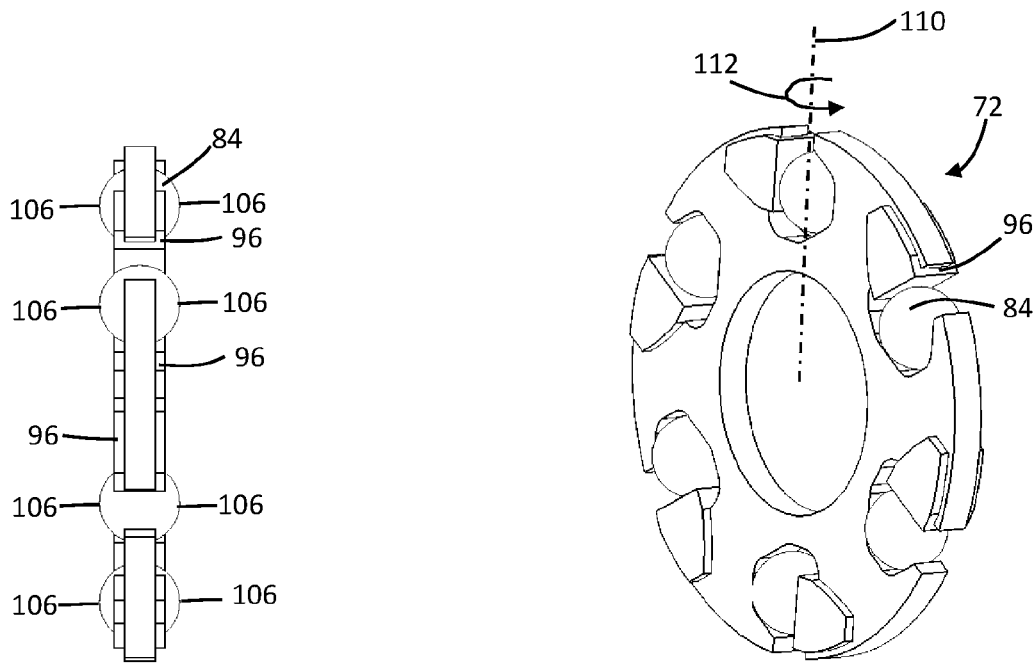
Fig. 8b
Fig. 8c

TORQUE TRANSFERRING ASSEMBLY FOR A BRAKE ASSEMBLY

FIELD

These teachings relate to a torque transferring assembly for transferring torque to at least two outputs.

BACKGROUND

Some vehicles, like trucks, vans, SUVs, and high-performance vehicles use multi-piston hydraulic brake systems for vehicle deceleration. These systems typically have a separate parking brake system for maintaining the vehicle in a stopped or parked position.

To improve parking brake performance, while also reducing weight, cost, and packaging space, in some vehicle platforms, it may be desirable to have a parking brake system that utilizes some of the components of the existing multi-piston hydraulic brake system. For example, it may be desirable to have a parking brake system that utilizes the existing multiple brake pistons to create clamping force without requiring a specially designed high output motor, a relatively large motor, or multiple motors, to move the multiple brake pistons and brake pads against a brake rotor to create the clamping force.

Assemblies that utilize a single motor for moving multiple brake pistons to create and release the clamping force have been previously considered. However, it may be desirable to improve on these assemblies, and provide a lightweight and cost-effective assembly for moving multiple brake pistons with a single motor to create and release clamping force during a brake apply and release.

SUMMARY

These teachings provide a torque transferring assembly. The torque transferring assembly functions to transfer torque from a single source to at least two outputs.

It is contemplated that these teachings can be applied to virtually any system or assembly where it is desired to transfer torque from a single source to at least two outputs. For example, these teachings can be applied to a vehicle brake system to provide a light and cost-effective assembly for moving multiple brake pistons with a single motor to create clamping force.

The present teachings may also be used in non-vehicular applications. For example, the teachings herein may be applied to brake assemblies used in various machines, such as a lathe, a winder for paper products or cloth, amusement park rides, wind turbines, or the like.

These teachings provide a torque transferring assembly that includes: a first output; a second output; and a spider located in between the first output and the second output. The spider is adapted to support a plurality of torque transferring elements such that each of the torque transferring elements are in communication with both of the first output and the second output. The torque transferring assembly is adapted to supply a torque to both the first output and the second output so that both outputs rotate together until a load or resistance acting on the first output becomes higher than a load or resistance acting on the second output. The torque transferring assembly is then adapted to transfer the torque to the second output so that the first output slows or ceases to rotate, while the second output continues to rotate.

These teachings provide a brake system. The brake system comprises: a first brake piston; a second brake piston; a brake pad; a torque transferring assembly comprising: a first output, a second output, and a spider; and a motor. The spider is located in between the first output and the second output, the spider is adapted to support a plurality of torque transferring elements such that each of the torque transferring elements are in contact with both of the first output and the second output. The first brake piston is in communication with the first output, and the second brake piston is in communication with the second output. The torque transferring assembly is adapted to supply a first rotational direction torque supplied by the motor to both the first output and the second output so that both brake pistons move together until a load or resistance acting on the first brake piston becomes higher than a load or resistance acting on the second brake piston, the power transferring assembly is then adapted to transfer the first rotational direction torque to the second output so that the first output slows or ceases to rotate, while the second output continues to rotate so that the first brake piston slows or ceases to move, while the second brake piston continues to move. The torque transferring assembly is adapted to supply a second rotational direction torque supplied by the motor to both the first output and the second output so that both outputs rotate together regardless of the load or resistance acting on the first brake piston or the second brake piston so that both the first brake piston and the second brake piston move.

BRIEF DESCRIPTION OF THE DRAWINGS

FIG. 4 is a perceptive view of a race of the torque transferring assembly of FIG. 3.
FIG. 5 is a front view of a spider of the torque transferring assembly of FIG. 3.
FIG. 6 is a front view of another spider of the torque transferring assembly of FIG. 3.
FIG. 7 is a perspective view of another spider of the torque transferring assembly of FIG. 3.
FIG. 8a is a front view of another spider of the torque transferring assembly of FIG. 3.
FIG. 8b is a side view of the spider of FIG. 8a.
FIG. 8c is a perspective view of the spider of FIG. 8a.

DETAILED DESCRIPTION

Figure 1:
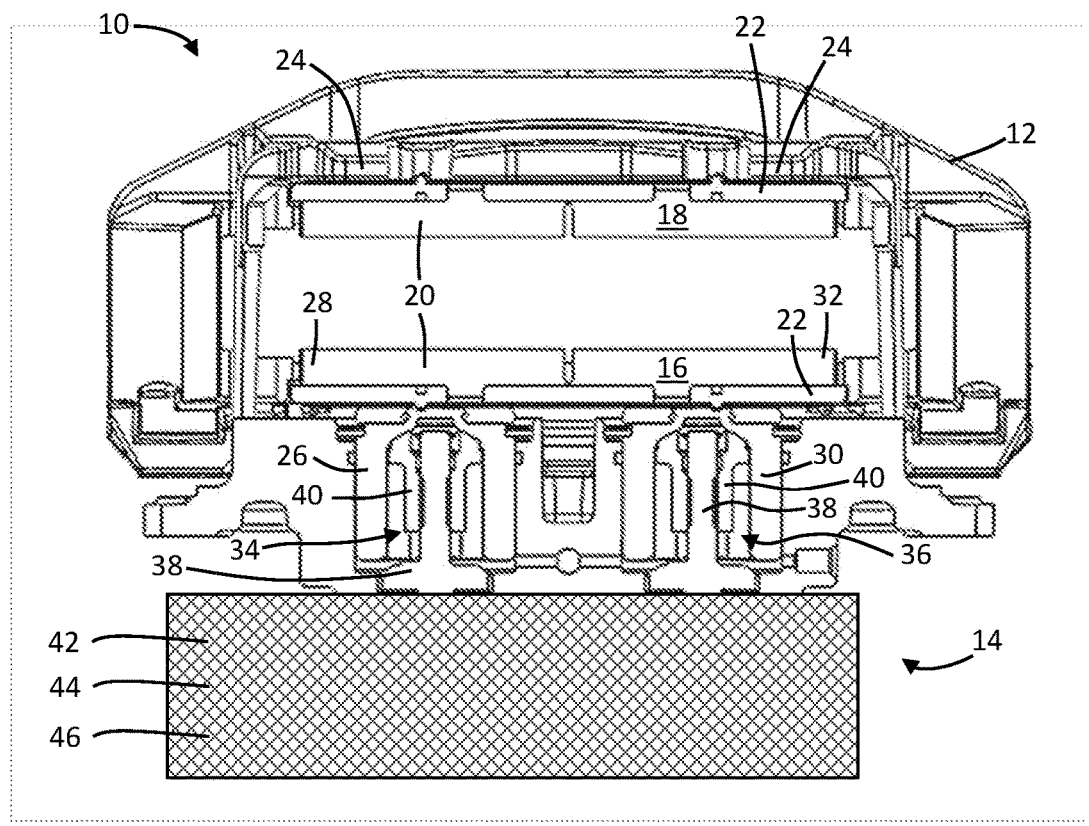
FIG. 1 is a cross-sectional view of a brake assembly.

This application claims the benefit of U.S. 62/420,711 filed on Nov. 11, 2016 and U.S. 62/466,413 filed on Mar. 3, 2017, both of which are hereby incorporated by reference herein for all purposes.

The teachings herein provide a brake assembly. The brake assembly may be any system or assembly for creating a clamping force. The brake assembly may function to create a clamping force and/or brake apply to slow, stop, and/or maintain a vehicle in a stopped position. The brake assembly may be any type of brake assembly. For example, the brake assembly may be an opposing brake assembly (i.e., a fixed caliper brake assembly) or a floating brake assembly (i.e., a floating caliper). The assembly may be a disc brake system. The brake assembly may be a service brake assembly.

The brake assembly may also be used in non-vehicular applications. For example, the brake assembly may be applied to brake assemblies used in various machines, such as a lathe, a winder for paper products or cloth, amusement park rides, wind turbines, or the like.

The brake assembly may generally include one or more brake pads, and a brake caliper supporting one or more brake pistons. During a standard brake apply, the one or more brake pistons may be moved against the one or more brake pads by pressurizing brake fluid. The brake pads may be moved against the brake rotor to create clamping force. Alternatively, during a standard brake apply, the one or more brake pistons and brake pads may be moved with electro-mechanical elements to create clamping force. A parking brake assembly may be added to or integrated with the brake assembly. The parking brake assembly may be an ancillary assembly or system added to, or incorporated with, the brake assembly.

The clamping force may be a force that, when coupled with a brake pad coefficient of friction, functions to decelerate, slow, stop, and/or prevent movement or rotation of a brake rotor and/or a vehicle. The clamping force may be created during a standard brake apply (i.e., a brake apply force). The clamping force may be created during a parking brake apply (i.e., a parking brake force).

The brake rotor may cooperate with the components of the brake assembly, the parking brake assembly, or both to create the clamping force. The brake rotor may include an inboard side and an opposing outboard side. The brake caliper may be arranged so that one or more brake pads are located at the inboard side of the brake rotor (i.e., inboard brake pads), and one or more brake pads are located at the outboard side of the brake rotor (i.e., outboard brake pads), or both. The brake caliper may be arranged so that one or more brake pistons are located at the inboard side, one or more brake pistons are located at the outboard side, or both. When a vehicle is in motion, the brake rotor may rotate with a wheel and about an axle of a vehicle. To create the clamping force during a standard brake apply, or during a parking brake apply, the friction material of one or more brake pads can be moved or pushed against at least one of the sides of the brake rotor. After the clamping force is created, the brake rotor may be restricted from moving and/or rotating, and, accordingly, the vehicle may be slowed, stopped, and/or restricted from moving. To release the clamping force, the friction material of the one or more brake pads can be moved away from the brake rotor. After the clamping force has been released, the brake rotor and, accordingly, the vehicle may move again.

One or more brake pads may be used to create the clamping force. The clamping force can be created by converting the kinetic energy of the vehicle into thermal energy by frictionally engaging one or more brake pads with one or more sides of the brake rotor. The one or more brake pads may include one or more features (i.e. ears, projections, etc.) that may engage or be engaged by a brake caliper, a support bracket, or both to maintain the location of the brake pads within the braking system and relative to the brake rotor.

The one or more brake pads may include a friction material and a pressure plate. The one or more brake pads may be supported on the brake caliper so that the friction material faces a side of the brake rotor. The pressure plate may oppose the friction surface. One or more brake pistons or one or more brake caliper fingers may be in selective contact with the pressure plate of a corresponding brake pad. For example, in some cases, one or more brake pistons may be in contact with the pressure plate of an inboard brake pad, and one or more brake caliper fingers may be in contact with the pressure plate of an outboard brake pad. In some cases, one or more brake pistons may be in contact with the pressure place of an inboard brake pad, and one or more brake pistons may be in contact with the pressure place of an outboard brake piston. During a brake apply, or while applying the parking brake, the one or more brake pistons and/or the one or more fingers can move all or an end of a corresponding brake pad so that the corresponding friction material engages a corresponding side of the brake rotor to create the clamping force.

The one or more brake pads may comprise one or more inboard brake pads that are moveable towards and away from an inboard side of the brake rotor. The one or more brake pads may comprise one or more outboard brake pads that are moveable towards and away from an outboard side of the brake rotor. When the brake assembly or the parking brake assembly is applied or released, the brake pads (e.g., the inboard and outboard pads), or portions thereof can be moved relative to the brake rotor together, individually, sequentially, or a combination thereof. In other words, the brake pads can be moved towards and/or away from the brake rotor at the same time, or one or more brake pads can be moved before one or more other brake pads are moved. A first end of a brake pad (i.e., a leading end) may be moved towards or away from the brake rotor together, individually, sequentially, before, after, or in any combination thereof with a second end of the same brake pad (i.e., a trailing end).

The distance that the one or more of the brake pads are moved, or the distance that the ends of one or more brake pads must be moved relative to the brake rotor to create the clamping force may vary depending on taper wear. Taper wear may be defined as the tendency of the friction material of a brake pad to wear unevenly during use. Taper wear may result in the inboard, outboard or both pressure plates of the inboard, outboard or both brake pads no longer being parallel to the sides of a brake rotor. For example, during a brake apply, a parking brake apply, or both, a leading end of a brake pad may contact the brake rotor first and/or with greater force than the trailing end of the brake pad. This may cause the leading end to wear more, or wear faster, than the trailing end. Over time, the leading end of a brake pad will have moved a greater distance than the trailing end to sufficiently engage the brake rotor and create the clamping force. To compensate for these differences, it may be desirable to be able to be able to move the ends of a brake pad different distances and/or at different times to ensure a sufficient clamping force is created. Moving the ends of a brake pad different distances and/or at different times may be accomplished according to the teachings herein, by including utilizing the torque transferring assembly.

The brake caliper may function to support one or more the components of the brake assembly, one or more the components of the parking brake assembly, or both. For example, the brake caliper may include one or more supports configured to engage and/or support the one or more brake pads. The brake caliper may provide for one or more brake pads, or, preferably, two or more brake pads to move relative to the brake rotor. The brake caliper may move during a brake apply (i.e., a floating caliper), or the brake caliper may be fixed so that the brake caliper does not move during a brake apply (i.e., a fixed caliper). The brake caliper may be connected to any non-rotating or moving part of a vehicle, like a support or a knuckle.

The brake caliper may have one or more piston bores. Each piston bore may define one or more hollow regions in the brake caliper configured to receive and support a corresponding brake piston. Some brake calipers have two or more piston bores. The piston bores can be located on only one side of the brake rotor, or on both sides of the brake rotor. Each piston bore includes a piston bore axis. The piston bore axis may extend generally perpendicular to a side of the brake rotor. A brake piston supported within a piston bore may be moved along the piston bore axis to create or release a clamping force during a standard brake apply, a parking brake apply, or both.

The one or more brake pistons may function to move a brake pad, or a corresponding end of brake pad, towards the brake rotor to create the clamping force. During a brake apply to decelerate or stop a vehicle, the brake pistons may be moved by pressurizing fluid, such as brake fluid. To release the clamping force or the brake apply, the brake piston can be moved by depressurizing the fluid. Of course, other ways of moving the brake pistons during a standard brake apply are contemplated. For example, moving the brake pistons with electromechanical mechanisms similar to those used for this parking brake assembly are contemplated (e.g., with one or more rotary to linear state mechanisms; spindles; nuts; etc.). During a parking brake apply, to create clamping force, the brake piston may be moved by actuating a corresponding rotary to linear stage mechanism in an apply direction. To release the clamping force or the parking brake, the brake piston can be moved by actuating the corresponding rotary to linear stage mechanism in an opposing release direction. During both a parking brake apply and a standard brake apply, the brake piston may be moved along a brake piston axis, which may be collinear or essentially collinear with the piston bore axis. The brake piston may include a closed end selectively engaging the pressure plate of an inboard brake pad and an open end defining an opening into a brake piston pocket.

The brake piston pocket may function to receive at least a portion of a corresponding rotary to linear stage mechanism. The brake piston pocket may be a cup or recess formed into an end of a brake piston. The brake piston pocket may include a bottom wall at the end or bottom of the brake piston pocket and an opposing open end. A gap may exist between the nut of the rotary to linear stage mechanism and a corresponding bottom wall. During a parking brake apply, the gap may be taken up by moving the rotary to linear stage mechanism towards the bottom wall. Once the gap is taken up, further movement of the nut or rotary to linear stage mechanism may cause the nut or the rotary to linear stage mechanism to press against the bottom wall and then move the brake piston and thus brake pad against the brake rotor to create the clamping force.

A parking brake assembly may be added to or integrated with the brake assembly. The parking brake assembly may function to create a clamping force to maintain a vehicle in a stopped or parked position. The parking brake assembly may utilize one or more components of the brake assembly to create the clamping force, parking brake force, or both. For example, during a parking brake apply, the one or more brake pistons and the brake pads may be moved with the parking brake assembly against the brake rotor to create the clamping force. The one or more brake pistons and the brake pads may be moved away from the brake rotor to release the clamping force. The parking brake assembly may comprise a motor gear unit (MGU).

The motor gear unit (MGU) may function to create or generate, and then transfer a force or torque suitable for creating and/or releasing a clamping force during a parking brake apply or release. During application of the parking brake, to create a clamping force, the MGU may function to generate torque sufficient to move the one or more rotary to linear stage mechanisms, the one or more brake pistons, the one or more brake pads, or a combination thereof toward the brake rotor thus creating drag which acts to prevent vehicle wheel rotation. During release of the parking brake to release the clamping force, the MGU may function to generate torque sufficient to move the one or more rotary to linear stage mechanisms, the one or more brake pistons, or both away from the one or more brake pads so that the brake pads move away from the brake rotor thus releasing the clamping force. The motor gear unit (MGU) may be any device or combination of devices that may function to perform one or more of the aforementioned functions.

At least a portion of the MGU may be contained within a housing. The housing may be integrally formed with the brake caliper; removably attached to the brake caliper; permanently attached to the brake caliper; or attached in any suitable way to any part of a vehicle, such as a support, support bracket, or knuckle. Preferably, the MGU is contained within a housing, which can be attached to a brake assembly with one or more suitable fasteners. The housing containing the MGU may be attached to the brake assembly after the brake assembly has been assembled. The housing containing the MGU may be attached to the brake assembly, separated from the brake assembly to service one or more components of the brake assembly, the parking brake assembly, or both, and then reassembly the housing to the brake assembly. The motor gear unit (MGU) may include a motor, one or more gears or gear trains, one or more torque transferring mechanisms, one or more rotary to linear stage mechanisms, or a combination thereof.

The motor may be any motor for creating a force or torque. For example, the motor may be a DC motor, a brushless motor, a series-wound motor, a shunt wound motor, a compound wound motor, a separately exited motor, a servomotor, a stepping motor, or a permanent magnet motor. The motor may include one or more electrical leads for connecting the motor to a power source. Supplying power to the motor may cause the output shaft of the motor to rotate about an axis. The output shaft rotation may be adapted for an apply direction (to create a clamping force) and for a release direction (to release a clamping force).

The motor gear unit (MGU) may include one or more gears or gear trains that may function to transfer, increase, and/or decrease a torque output of the motor. The gear train may include one or more gears. The gear train may connect the motor, the torque transferring assembly, or both to one or more components of the torque transferring assembly, such as one or more spindles of the rotary to linear stage mechanisms.

The one or more rotary to linear stage mechanisms may function to transfer a torque output from the MGU or motor into a linear or axial force to move the one or more brake pistons. The one or more rotary to linear stage mechanisms may be a high-efficiency device such as a ball screw, a roller screw, or a ball ramp, for example. The one or more rotary to linear stage mechanisms may be a low-efficiency device such as lead screw. The one or more rotary to linear stage mechanisms may generally include a spindle and a nut.

The spindle may be rotated by the MGU or a gear train or any connection located between the motor, the MGU or both. The spindle may be rotated by an outer of the torque transfer assembly. The spindle may be rotated in an apply direction and a release direction to apply and release the parking brake, respectively. Rotation of the spindle may cause a nut that is threadably engaged with the spindle to move axially along an axis in an apply or release direction to move the brake pad towards or away from a brake rotor.

Each spindle may include one nut. The nut may be moved axially along the axis that the spindle rotates about, a brake piston axis along which the brake piston is axially moved, or both. The nut may be moved by the spindle. For example, the nut and the spindle may be threadably engaged such that when the spindle is rotated by the motor or the MGU or the output of the torque transferring assembly, the nut moves axially toward or away from a wall of the piston pocket. After contact between the nut and the piston pocket wall is made, further movement of the nut may result in movement of a brake piston and thus a brake pad, or a corresponding end of a brake pad towards a brake pad.

The torque transferring assembly may function to provide, distribute, redistribute, or transfer an input torque to one or more outputs. The torque transferring assembly may function to provide, distribute, redistribute, or transfer an input torque to move one or more brake pistons during a standard brake apply (i.e., service brake apply), or during a parking brake apply, to create or release a clamping force. The torque transferring assembly may function to provide, distribute, redistribute, or transfer an input torque supplied by a motor or MGU or any other source to move one or more rotary to linear stage mechanisms during a standard brake apply or release (i.e., service brake apply or release), or a parking brake apply or release, to create or release a clamping force. The torque transferring assembly may be part of the MGU, or at least contained within a housing of the MGU.

The torque transferring assembly may function to distribute or transfer torque to one or more outputs. The one or more outputs may be in communication with a corresponding rotary to linear stage mechanism. The one or more outputs may be in communication with a corresponding spindle. Rotation of an output in an apply direction may cause the spindle to rotate in an apply direction, and rotation of the output in a release direction may cause the spindle to rotate in a release direction. The one or more outputs may be in communication with a corresponding brake piston or brake pad. Rotation of an output in an apply direction may cause the brake pad or brake piston to move apply direction, and rotation of the output in a release direction may cause the brake pad or brake piston to move in a release direction.

The torque transferring assembly may include one or more outputs. The one or more outputs may cause, may function to, or may be adapted to, transfer the torque from the motor or MGU or any other source to a destination, like a rotary to linear state mechanism, spindle, brake piston, etc. The one or more outputs may be rotatably supported on a common axle.

Under certain conditions, the torque transferring assembly may function like an open or unlocked differential. These conditions may occur during a parking brake apply to generate clamping force, or during a standard brake or service brake apply to generate clamping force. However, these conditions may also occur during other conditions, such as during release of the parking brake apply or during release of the standard brake or service brake to release the corresponding clamping force. What is meant by the torque transferring assembly functioning like an open or unlocked differential is that when a load or resistance acts on one of the outputs or brake pistons, the rotational speed of that output may slow down compared to when a lower load or no load or resistance is acting on that output or brake piston, while the common axle continues to be rotated. When a load or resistance acts on one of the outputs or brake pistons, that output may cease rotation, while the common axle and the other output continues to rotate. The one or more outputs may rotate at different rotational speeds than the common axle, depending on the load acting on the outputs. For example, when the rotational speed of one of the outputs slows or ceases to rotate because of the load acting on it, the other output may continue to rotate at the same speed, or preferably at a faster rotational speed than the common axle. In fact, the other output with no load acting on it, or a lower load acting on it compared to the load acting on the output that slowed or ceased rotation may rotate at twice the speed of the rotation of the common axle.

Under certain conditions, the torque transferring assembly may function like a closed or locked differential. These conditions may occur during a parking brake release to release the clamping force or during release of a standard brake or service brake apply to release clamp force. What is meant by the torque transferring assembly functioning like a closed or locked differential is that both of the outputs will rotate with the common axle in the same direction and at the same speed even if a load is acting on only one of the output or brake pistons is, or if the load or resistance acting on one of the outputs or pistons is different than a load or resistance acting on the other output. This advantageously ensures that the plurality of brake pistons can be fully released, moved, or retracted during release of the service brake or parking brake.

If the same load is acting on both outputs or brake pistons during release of the service brake or parking brake (i.e., if the loads are balanced at both outputs or brake pistons), both outputs will rotate with the common axle in the same direction and at the same speed regardless if the torque transferring elements are located in the track that corresponds with the open or unlocked differential or in the track that corresponds with the closed or locked differential. This is because when the same load is acting on both outputs or pistons, the races will not move with respect to one another and therefore the torque transferring elements will not roll into the track associated with the closed or locked differential (i.e., the outer track) for releasing the service brake or parking brake.

The one or more outputs may be a gear with teeth that mesh with a mating gear or gear train to transfer the torque from the motor or MGU to any destination, such as to a spindle of a rotary to linear stage mechanism. The one or more outputs may be a non-toothed wheel or common axle output that is connected to a mating component by way of direct contact (i.e., friction) or belts or chains to transfer the torque from the motor or MGU to any destination, such as to a spindle.

The common axle may function to transmit torque from the output of the motor or the motor shaft to the one or more components of the torque transferring assembly. The common axle may be a separate and discrete component that is fixedly installed on the motor shaft. The common axle may be installed on the motor shaft—for example, the output shaft of the motor can be received and secured in into a pocket or bore in the common axle. Other methods of connecting the output shaft and axle are envisions, for example by using mechanical fasteners (i.e., pins, welding, etc.). Alternatively, the common axle may be actual the motor shaft. In this regard, the torque transferring assembly can be installed directly on the output shaft of the motor. One or more outputs, races, spiders, thrust bearings, springs, and stoppers may be located on the common axle.

The one or more races may function to support one or more torque transferring elements. The one or more races may transmit or transfer torque from the one or more torque transferring elements to a corresponding output. The race may rotate independently of or about the common axle, but may be restricted from rotating independently of a corresponding output. That is, a race and a corresponding output are adapted to always rotate together, but can rotate independently of the axle. The race may be a separate discrete component, or a race may be mechanically attached or integrally formed with an output.

A race may be rotationally synchronized with a corresponding output so that rotation of a race causes a corresponding output to rotate, and vice versa. The races may provide for a plurality of torque transferring elements to be contained within an at least partially enclosed track that is formed by two opposing races that are located diametrically opposed the ball bearings. An axial load or preload may be applied on the races so that the torque transferring elements are maintained in contact with the tracks so that torque can be transferred from the motor to the torque transferring elements and to the races and thus to the outputs. This preload may be accomplished during assembly of the torque transferring assembly. The preload may be accomplished and/or maintained with a spring or other compression mechanism.

A tangent portion of equator of each torque transferring element may be in contact and remain in contact with the races during an entire parking brake apply and release of the parking brake. An axial load or preload may be applied on the races so that the torque transferring elements are free from slipping within or relative to the tracks.

Each race may be made of plastic, metal, or a combination thereof.

Each race may include one or more tracks. One or more of the tracks may be substantially smooth. One or more of the tracks may be a regular polygon and/or may include a plurality of adjacently disposed scallops, notches, grooves, detents, divots, edges, or other features similar features. Each of the polygon features may have a generally flat or planar bottom. The one or more torque transferring elements may be located in the same track during both a parking brake apply and during release of the parking brake apply (or during a service brake apply or release of the service brake). Alternatively, one or more or all of the torque transferring elements may be located in one of the tracks during application of the parking brake (or application of the service brake), and then one or more or all of the torque transferring elements may roll into or become repositioned to another track during release of the parking brake (or release of service brake).

When one or more of the torque transferring elements are in the first or substantially smooth track, the torque transferring assembly may function as an open or unlocked differential. When the one or more of the torque transferring elements are in the second track, the torque transferring assembly may function as a closed or locked differential. That is, the torque transferring elements may be trapped between opposing polygon features and corners of the slot in the race to restrict or prevent the torque transferring elements from spinning or rotating so that the outputs do not rotate independently of each other.

The torque transferring assembly may comprise one or more spiders. The spider may function to transmit or transfer torque from the motor, the MGU, the common axle or a combination thereof to one or more of the outputs. The spider may be rotationally fixed to the common axle so that the spider is prevented from rotating independently of the axle. The spider may also be axially fixed to the common axle so that the spider is prevented from axially moving along a longitudinal axis of the axle. The spider is fixedly attached to the common axle and is located such that contact between the torque transferring elements and the spider occurs on the mid-plane of the spider.

The spider may include one or more slots. The one or more slots may be notches, cutouts, slots, recesses, or grooves. Each of these slots may be configured to contain, house, or support a ball bearing. The slots may be shaped so that torque from the motor shaft or common axle is transferred into the torque transferring elements during a normal operation of the torque sensing assembly (i.e., during a normal parking brake apply or release of the parking brake). Each of the slots may be adapted to support a torque transferring element to keep the torque transferring element from falling out of a slot, but allow for a torque transferring element to rotate or spin about its own axis.

One or more of the slots may be directional in shape so that the torque transferring elements are moved, rolled or forced onto or into the inner track when the spider is rotated in the apply direction (during a parking brake or service brake apply), and then moved, rolled or forced onto or into the outer track when the spider is rotated in the release direction (during release of the parking brake or the service brake).

One or more of the slots, or portions of the one or more slots, may be semi-circular (e.g., FIG. 5). These semi-circular slots are designed or configured to minimize the difference in torque applied to each race and thus to each output. Each semi-circular slot may be adapted to contact each corresponding torque transferring element at an equator or at generally opposing areas of the ball bearing. Each semi-circular slot may be adapted to contact each corresponding torque transferring element in two places during a parking brake apply and also during release of the parking brake (and/or during service brake apply/release).

One or more of the slots, or portions of the one or more slots, may include a complex shape that includes one or more flat surfaces that may contact the torque transferring element (FIGS. 6-8*c*, and 11-13). These complex shaped slots or portions are designed to minimize the difference in torque applied to each race and thus to each output in the apply direction, and to amplify the difference in torque applied to each race and thus to each output in the release direction. These complex shaped slots may include at least two contact points or areas that are configured to contact the torque transferring element located in that slot. The torque transferring elements may be contacted by the contact areas in areas located or defined between opposing poles of the torque transferring element and the equator of the ball bearing. That is, assuming each torque transferring element includes opposing poles separated by approximately 180 degrees, and opposing tangent portions located generally perpendicular to the poles and also separated by approximately 180 degrees, the torque transferring elements may be contacted by the spider contact surfaces in regions located between an adjacent pole and tangent portion (See FIG. 7, for example).

The torque transferring assembly may comprise one or more torque transferring elements. The one or more torque transferring elements may function to transmit torque from the motor, MGU, axle, spider, or a combination thereof to one or more of the outputs or corresponding races. A torque transferring element may be supported in an individual slot or groove in the spider. Due to the axial preload and friction between the torque transferring elements and the race tracks, and due to a low load condition (i.e., when a low load or resistance is acting on the outputs), the tangent portions or equator of the torque transferring elements may remain stationary with respect to the races (i.e. not rotating). When load or resistance acting on an output increases, the output may slow or cease rotating and then the torque transferring elements may begin to rotate, or roll, or spin about their axis in the race tracks and slip or slide with respect to the grooves or notches in the spider, which may result in the other non-loaded output to rotate at a higher or increased rate with respect to the motor shaft. In fact, the other non-loaded output may rotate at a speed or rate that is double than that of the motor and/or spider if the loaded output is stationary.

The torque transferring elements may be circular balls. The torque transferring elements may be ball bearings. The torque transferring elements may be cylindrical elements or bearings. The torque transferring elements may be made of metal, plastic, or both. The torque transferring elements may be substantially smooth. The torque transferring elements may have at least some friction or rough surfaces to maintain contact or friction with the corresponding races, tracks, outputs, or a combination thereof. The one or more friction reducing elements may function to reduce or the friction or rough surface of the elements so that the elements spin or roll about their axis.

The torque transferring assembly may comprise one or more friction reduction elements. The one or more friction reducing elements may function to reduce the coefficient of friction between the spider and the torque transferring elements. The one or more friction reduction elements may function to yield a lower coefficient of friction between the friction element material and the torque transferring element material compared to the coefficient of friction between the material of the spider (which may be steel, for example) and the ball bearing. The friction reducing elements may be made of a suitable material such as plastic or a Teflon coated material. The friction reduction elements may be molded or fixedly mounted on the spider and are designed to contact the torque transferring elements when the motor rotates in the apply direction.

The spring may function to apply an axial load or preload on the components of the torque transferring assembly. The axial load or preload may function to ensure and maintain contact between the torque transferring elements and the corresponding tracks or races. The axial load or preload may function to maintain synchronous contact between the equator or the opposing tangent portions of each of the torque transferring elements and both of the tracks or races. In other words, the axial preload applied by the spring ensures that the torque transferring elements never slip or slide relative to the tracks or races during the parking brake apply and during release of the parking brake. This is what is meant by synchronous contact between the torque transferring elements and both of the tracks of the races. For clarification, the torque transferring elements only roll or spin about a torque transferring element axis (110, See FIG. 8c) relative to the spider when one of the outputs slow or cease rotating. However, when the torque transferring elements roll or spin about the torque transferring element axis, the equator or tangent portions remain in contact with both of the tracks due to the preload applied by the spring.

The stoppers may function to support the components of the torque transferring assembly on the common axle, and to react the spring load or preload on the components of the torque transferring assembly. At least one of the stoppers may be rigidly connected or formed onto the common axle, while the other separate stopper may be fixedly installed on the common axle as the last operation during the assembly of all components of the torque transferring assembly. For example, referring to FIG. 3, assuming stopper 82 is the rigidly connected or formed stopper on the common axle 62, the torque transferring assembly may be assembled by assembling the thrust bearing 78 onto the common axle 62, followed by output 76 and race 74, the spider 72 including the torque transferring elements 84, followed by race 70 and output 68, followed by the thrust bearing 66 and then spring 64. The other stopper 80 may then be installed on the common axle 62 such that the spring 64 applies the required axial preload on all of the components of the torque transferring assembly 46. More specifically, the other stopper 80 may then be installed on the common axle 62 such that the axial load applied by the spring 64 ensures that the tangent portions or equator of each of the torque transferring elements 84 remain contact with the corresponding race tracks during the parking brake apply or release of the parking brake. The fixed location of the second stopper may be determined during manufacturing to ensure that the spring load or preload is achieved within the design parameters for normal torque transferring assembly functionality. It is understood, however, that the stopper 80 may be the rigidly connected or formed stopper on the common axle 62. Accordingly, the manufacturing or assembly of the torque transferring assembly would be accomplished in the opposite, by, for example, assembling the spring 64 onto the axle 62, followed by the thrust bearing 66, output 68, race 70, then the spider 72 and torque transferring elements 84, the race 74, and output 76, followed by the thrust bearing 78. The stopper 82 can then be installed on the common axle 62, such that the spring 64 is compressed sufficiently to apply the required axial load on the spider and torque transferring elements 84 to ensure the torque transferring element equators remain in contact with both of the tracks.

The one or more thrust bearings may function to accept the preload applied by the spring and allow the races and outputs to rotate freely and independently of the common axle about the common axle.

FIG. 1 illustrates a brake assembly 10. The brake assembly 10 is a disc brake assembly or system that includes a brake caliper 12 and a parking brake assembly 14. The brake assembly 10 includes an inboard brake pad 16 and an outboard brake pad 18. Each brake pad 16, 18 includes a friction material 20 and a pressure plate 22. The brake pads 16, 18 are arranged on opposing sides of the brake caliper 12 so that the friction material 20 of each brake pad 16, 18 faces a side of a brake rotor located between the brake pads 16, 18. The brake caliper 12 includes fingers 24 that are in contact the pressure plate 22 of the outboard brake pad 18.

A brake piston 26 is located near a first or leading end 28 of the inboard brake pad 16, and another brake piston 30 is located near a second or trailing end 32 of the inboard brake pad 16. A rotary to linear stage mechanism 34 is in communication with the brake piston 26, and another rotary to linear stage mechanism 36 is in communication with the brake piston 30. Each rotary to linear stage mechanism 34, 36 includes a spindle 38 and a nut 40. Movement of the rotary to linear stage mechanisms 34, 36 causes the corresponding brake pistons 26, 30, to move towards or away from the inboard brake pad 16, which causes a corresponding end(s) 28, 32 of the brake pad 16 to move towards or away from the brake rotor.

The brake assembly 10 and/or the parking brake assembly 14 comprises a motor gear unit (MGU) 42 that includes a motor 44 and a torque transferring assembly 46.

Figure 2:
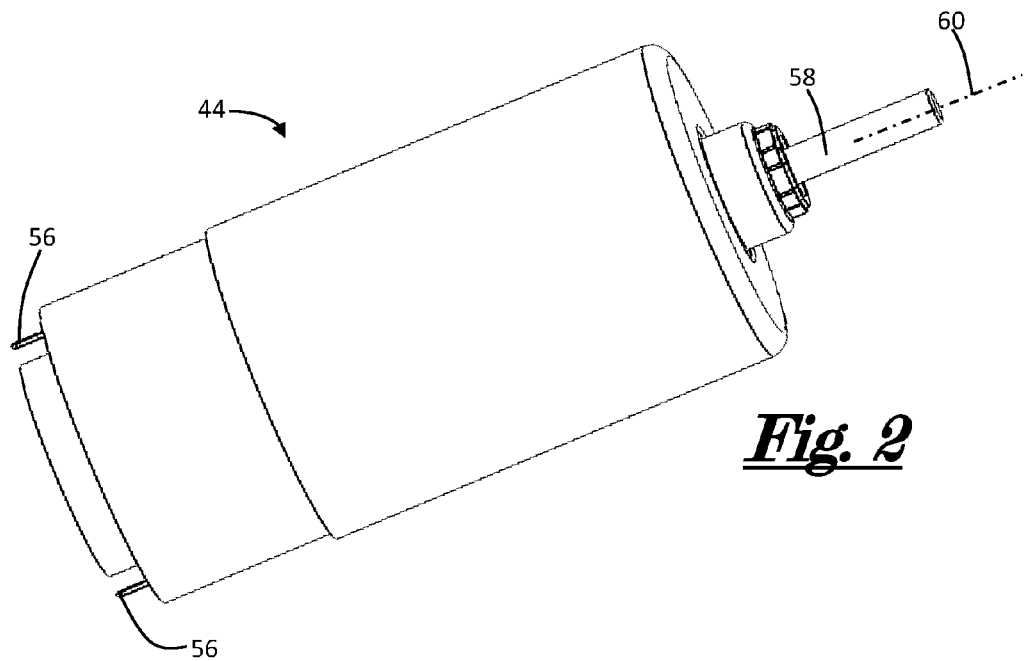
FIG. 2 is a perspective view of a motor.

FIG. 2 illustrates a motor 44. The motor 44 includes leads 56 for connecting the motor 44 to a power source or computer for turning the motor 44 ON and OFF. The motor 44 includes an output shaft 58 that rotates about an axis 60 when the motor 44 is powered by the power source or computer. As will be discussed further below, the output shaft 58 rotates about the axis 60 in an apply direction (to set or apply the parking brake or service brake) and a release direction (to release the parking brake or service brake).

Figure 3:
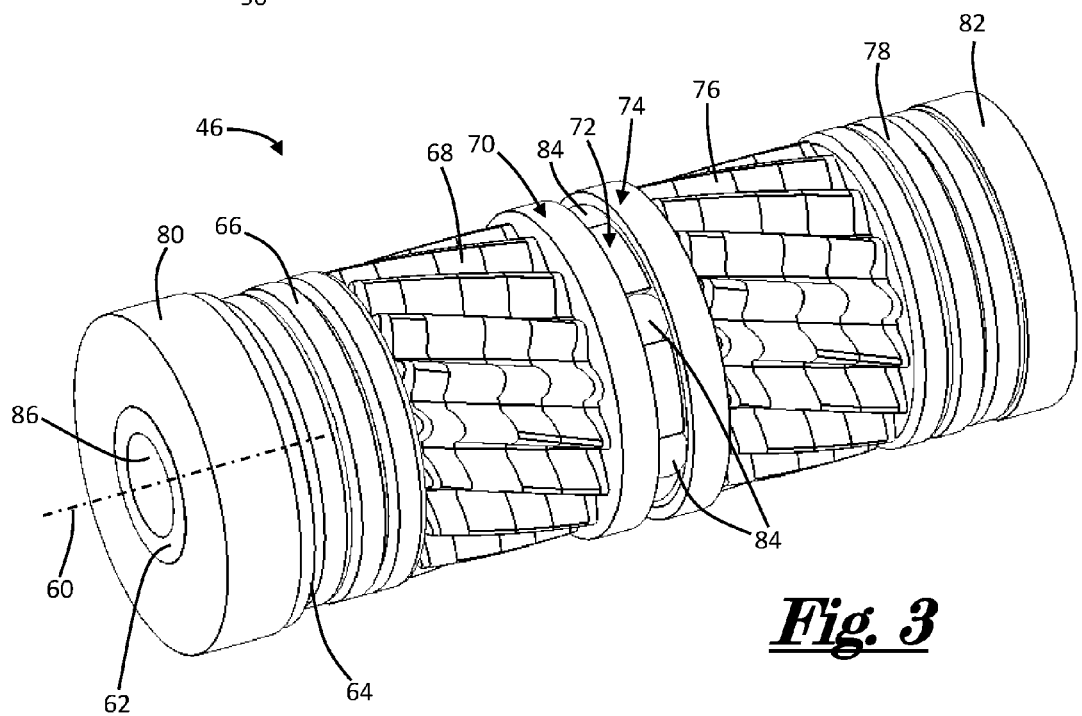
FIG. 3 is a perspective view of a torque transferring assembly.

FIG. 3 illustrates a torque transferring assembly 46. The torque transferring assembly 46 comprises an axle 62. The axle 62 is adapted to support one or more components of the assembly 46, such as a spring 64; a thrust bearing 66; an output 68; a race 70; a spider 72 supporting a plurality of torque transferring elements 84; another race 74; another output 76; and another thrust bearing 78, all of which are supported between two stoppers 80, 82. The axle 62, and the aforementioned components supported on the axle 62, are adapted to rotate about an axis 60, which is the same axis 60 about which the output shaft 58 of the motor 44 rotates (FIG. 2).

Output 68 and race 70 are attached, supported, or installed on the axle 62 such that the output 68 and race 70 are able to rotate independently of the axle 62. However, the output 68 and race 70 are unable or prevented from rotating independently of one another.

Similarly, output 76 and race 74 are attached, supported, or installed on the axle 62 such that the output 76 and race 74 are able to rotate independently of the axle 62. However, the output 76 and race 74 are unable or are prevented from rotating independently of one another.

The spider 72 is rotationally fixed to the axle 62 such that spider 72 rotates with the axle 62 when the axle 62 is rotated, and is unable to rotate independently of the axle 62. The spider 72 is also axially fixed on the axle 62 so that the spider 72 is unable to axially move along a length of the shaft 62, for example along axis 60 in a direction towards or away from the stoppers 80, 82.

The spring 64 is adapted to apply a preload on the thrust bearings 66, 78, the outputs 68, 76, the races 70, 74, the torque transferring elements 84, and the stoppers 80, 82. The axial preload by the spring 64 is adapted to maintain contact between the torque transferring elements 84 and the corresponding tracks 90 of the races 70, 74 that are illustrated in FIG. 4. It is understood that the tracks 90 may be formed directly onto a side of the corresponding outputs without deviating from the scope of these teachings.

Each output 68, 76 is in communication with a corresponding spindle 38 of the corresponding rotary to linear stage mechanism 34, 36 (FIG. 1). For example, rotation of output 68 causes spindle 38 of rotary to linear stage mechanism 34 to rotate, and rotation of output 76 causes spindle 38 of rotary to linear stage mechanism 36 to rotate, or vice versa. The communication between the outputs 68, 76 and the corresponding spindles 38 can be accomplished via one or more gears or other suitable force or torque transferring elements.

The axle 62 includes a bore 86 for receiving the output shaft 58 of the motor 44 (FIG. 3) such that rotation of the output shaft 58 causes the axle 62 to simultaneously rotate. However, the axle 62 may instead be the actual output shaft 58 of the motor 44 (FIG. 2) such that the aforementioned elements are supported directly on the output shat 58 of the motor 44 versus on the axle 62. That is, the spring 64, thrust bearings 66 and 78, outputs 68 and 76, races 70 and 74, spider 72, and stoppers 80, 82 can all be installed or supported on the actual output shaft 58 of the motor 44.

FIG. 4 illustrates an exemplary race 70, 74. Again, one or both of the races 70, 74 or features thereof may be integrally formed or attached to the corresponding output 68, 76. The race 70, 74 includes an opening 88 for receiving the axle 62; an annular groove or track 90 positioned or disposed around the opening 88 in which the torque transferring elements 84 are positioned when the torque transferring assembly 46 is assembled (FIG. 3); and a lip 92.

FIG. 5 illustrates an exemplary spider 72. The spider 72 includes an opening 89 for receiving the axle 62. The spider 72 includes a plurality of slots 94 positioned or disposed around the opening 89. Each slot 94 is adapted to loosely contain or support a torque transferring element 84. Each slot 94 includes a pair of opposing contacting surfaces 98.

During a service brake apply or a parking brake apply, or release of the service brake or parking brake, the spider 72 is rotated by the common axle 62 in the corresponding apply 100 or release 102 direction (FIG. 6), during which the contacting surfaces 98 of each slot 94 contacts and exerts a tangential load or force in two places on the corresponding torque transferring element 84 in each slot 94. The two places are the corresponding opposing tangent portions or equator 106 of each of the torque transferring elements 84 so that the torque transferring elements 84 rotate or spin about their axis 110 (See FIG. 8c) within the slots 94 when the spider 72 is rotated in the apply or release direction via the common axle 62.

FIG. 6 illustrates another exemplary spider 72. The spider 72 includes an opening 89 for receiving the axle 62. The spider 72 includes a plurality of slots 94. Each slot 94 is adapted to loosely contain a torque transferring element 84. Each slot 94 includes contacting surfaces 98, 104, 108.

During a service brake apply or parking brake apply, the spider 72 is rotated in the apply direction 100 by the common axle 62, during which time only the contacting surfaces 108 of each slot 94 contacts the tangent portion or equator 106 of the torque transferring element 84 located in each of the slots 94. Contact between the spider 72 and the torque transferring elements 84 in only one location during the service brake or parking brake apply functions to advantageously reduce the friction between the spider 72 and the torque transferring elements 84 allowing the torque transferring elements 84 to rotate or spin about their axis 110 (See FIG. 8c) so that the torque difference at each output 68, 76 is minimized. This helps ensure that when a load or resistance is acting on one of the outputs 68, 76, that output 68, 76 with the load or resistance on it will slow or cease rotating, while the other output 68, 76 without the load or resistance acting on it, or with a lower resistance or load acting on it, will continue to rotate or rotate faster than the common axle 62.

During release of the service brake or release of the parking brake, the spider 72 is rotated in direction 102 by the common axle 62, during which time only the contacting surfaces 98 and 104 of each slot 94 contact the respective torque transferring element 84 located in the slots 94. Contact between the spider 72 and the torque transferring elements 84 in two locations during release of the brake increases the friction or tangential load between the spider 72 and the torque transferring elements 84 so that the torque transferring elements 84 do not rotate about their axis 110 (FIG. 8C). This helps ensure the outputs 68, 76 rotate together with the common axle 62 without one of the outputs 68, 76 slowing or ceasing to rotate. This helps to ensure the outputs 68, 76 rotate together with the common axle 68, 76 as a common, single, locked axle, for example.

FIG. 7 illustrates another exemplary spider 72. The spider 72 includes an opening 89 for receiving the axle 62. The spider 72 includes a plurality of slots 94, each of which loosely contain a torque transferring element 84. Each of the slots 94 also include a friction reducing element 96 that is molded to or connected to the spider 72.

During a service brake apply or parking brake apply, the spider 72 is rotated in direction 100 (FIG. 6, FIG. 8*a*) and each of the friction reducing elements 96 are in contact with a corresponding torque transferring element 84 located in that slot 94. When the spider 72 is rotated in the apply direction 100 by the common axle 62, only the friction reducing element 96 contacts the tangent portion or equator 106 of the torque transferring element 84 located in that slot 94. Contact between the friction reducing element 96 and the torque transferring element 84 in one location during the parking brake apply functions to reduce the friction between the spider 72 and the torque transferring elements 84 allowing the torque transferring elements 84 to rotate about their axis 110 (See FIG. 8*c*) so that the torque difference at each output 68, 76 is minimized. This helps ensure that when a load or resistance is acting on one of the outputs 68, 76, that the output 68, 76 with the load or resistance acting on will slow or cease rotating, while the other output 68, 76 with little or no load or resistance acting on will continue to rotate, or even rotate faster than the common axle 62.

During release of the service brake or release of the parking brake, when the spider 72 is rotated in an opposing direction 102 (FIG. 6, 8*a*), the friction reducing elements 96 are not in contact with, or are free of contact with, the corresponding torque transferring element 84. Instead, during release of the service brake or parking brake, when the spider 72 is rotated in the release direction 102, contacting surfaces 98 and 104 of each slot 94 contact the torque transferring element 84.

As can be seen in FIG. 7 (and also FIG. 8*a*), the contacting surfaces 98 and 104 contact the torque transferring element 84 in locations between the opposing poles 108 of the torque transferring element 84 and the opposing tangent portions 106 or equator of the torque transferring element 84. Contacting the torque transferring elements in these areas increases the friction acting on the torque transferring elements 84 so that the torque transferring elements 84 are restricted from rotating or spinning relative to the race like they do in during the parking brake apply. Therefore, during the release of the service brake or release of the parking brake, both of the outputs 68, 76 rotate simultaneously, so the torque transferring assembly 46 rotates as a solid axle. Therefore, both pistons are moved in a release direction away from the brake pad at the same time. This ensures that an end of the brake pad does not remain in contact with the brake rotor, which may undesirably result in the brake pad or the portion of the brake pad dragging on the brake rotor.

FIGS. 8*a*-8*c* illustrate another exemplary spider 72. The description relating to FIG. 7 may equally apply to the spider 72 illustrated in FIGS. 8*a*-8*c*. However, the friction reducing elements 96 are U-shaped (best shown in FIG. 8*c*), thus allowing easier installation/assembly of the spider 72

Referring to FIGS. 1-8C, when the torque transferring assembly is assembled, the opposing tangent portions 106 or equator of the torque transferring element 84 are maintained in synchronous contact with the track 90 of each of the races 70, 74 illustrated in FIG. 4, via the axial preload applied by the spring 64 (FIG. 3).

With continued reference to the FIGS. 1-8C, a method of applying the service brake or a parking brake will be described. After the service brake or parking brake is activated or turned ON, power is supplied to the motor 44 and the output shaft 58 of the motor 44 rotates in an apply direction. Rotation of the output shaft 58 in an apply direction causes the common axle 62 to rotate in an apply direction. Rotation of the common axle 62 in the apply direction causes the spider 72 to exert a tangential load on each of the torque transferring elements 84 so that the torque transferring elements 84 move or rotate with the axle 62 in the apply direction. During this initial apply condition, when there is little to no load acting on the outputs 68, 76, the torque transferring elements 84 do not spin about their corresponding bearing axis 110 (FIG. 8*c*).

During the initial stages of the brake apply, when little or no load is acting on the outputs 68, 76, due to both the preload applied by the spring 64 and the friction between the torque transferring elements 84 and the tracks 90, torque from the motor 44 is transmitted from the torque transferring elements 84 to the corresponding races 70, 74, and then to the corresponding outputs 68, 76 via the contact between the races 70, 74 and the corresponding outputs 68, 76. This torque applied to the outputs 68, 76 causes both of the outputs 68, 76 to rotate in an apply direction. Rotation of the outputs 68, 76 in the apply direction causes the corresponding spindles 38 of the rotary to linear stage mechanisms 34, 36 to move in an apply direction until a gap defined between each of the nuts 40 and the corresponding piston pockets in the brake pistons 26, 30 is taken up or eliminated. It should be noted that when both outputs 68, 76 rotate together, the outputs 68, 76 rotate at a speed that is generally the same as the rotational speed of the spider 72 and axle 62.

Typically, the gap between the nut 40 and piston pocket of brake piston 30 is taken up first because of its location at the trailing end 32 of the brake pad 16. This results in the load or resistance acting on one of the outputs 68, 76 to increase first.

For the sake of clarity in describing the operation of the torque transferring assembly 46, we shall assume output 76 corresponds to the rotary to linear stage mechanism 36, nut 40, and brake piston 30 located at the trailing end 32 of the brake pad 16. It is understood, however, that output 68 may instead correspond to the rotary to linear stage mechanism 36, nut 40, and brake piston 30 and, therefore, the following description would still apply, except for any reference to output 76 and its interaction with its corresponding downstream elements should be interpreted as a reference to output 68 and its interaction with its corresponding downstream elements.

After the gap between nut 40 and the piston pocket of the brake piston 30 is taken up, continued rotation of the output 76 in the apply direction causes the nut 40 to move the brake piston 30 towards the brake pad 16 and then move the end 32 of the brake pad 16 towards the brake rotor to begin developing clamp force or parking brake force. Accordingly, the resistance at the brake piston 30 increases and becomes higher than the load at brake piston 26 when this occurs. Accordingly, this causes the load or resistance acting on output 76 to increase and become higher than the load or resistance acting on output 68 so that the output 76 eventually ceases to rotate and the torque transferring elements 84 begin to roll, spin, or rotate with respect to the races 70, 74 and slip and/or slide in the slots 94 of to the spider 72. The torque transferring elements 84 may roll, spin, or rotate about a torque transferring element axis 110 in direction 112 or in a direction that opposes or is different than direction 110 (FIG. 8c).

When the output 76 ceases to rotate, rotation of the linear stage mechanism 36 and the corresponding brake piston 30 ceases to move. The rolling, slipping, rotating, and/or spinning of the torque transferring elements 84 causes the output 68 to continue to rotate in the apply direction, but at a faster rate than when both outputs 68, 76 rotate together. For example, rotation of the output 76 may be twice that of the rotation of the axle 62.

Continued rotation of output 76 in the apply direction results in the linear stage mechanism 34 continuing to move so that the brake piston 26 continue to moves the end 28 of the brake pad 16 towards the brake rotor to develop the clamp force or the parking brake force. While the brake pad 16 is moved towards the brake rotor, the outboard brake pad 18 is pulled towards and eventually into contact with an opposing side of the brake rotor with the fingers 24 (FIG. 1).

The above method or description of application of the service brake/parking brake may also apply to the following discussion and illustrations of FIGS. 9-13.

Figure 9:
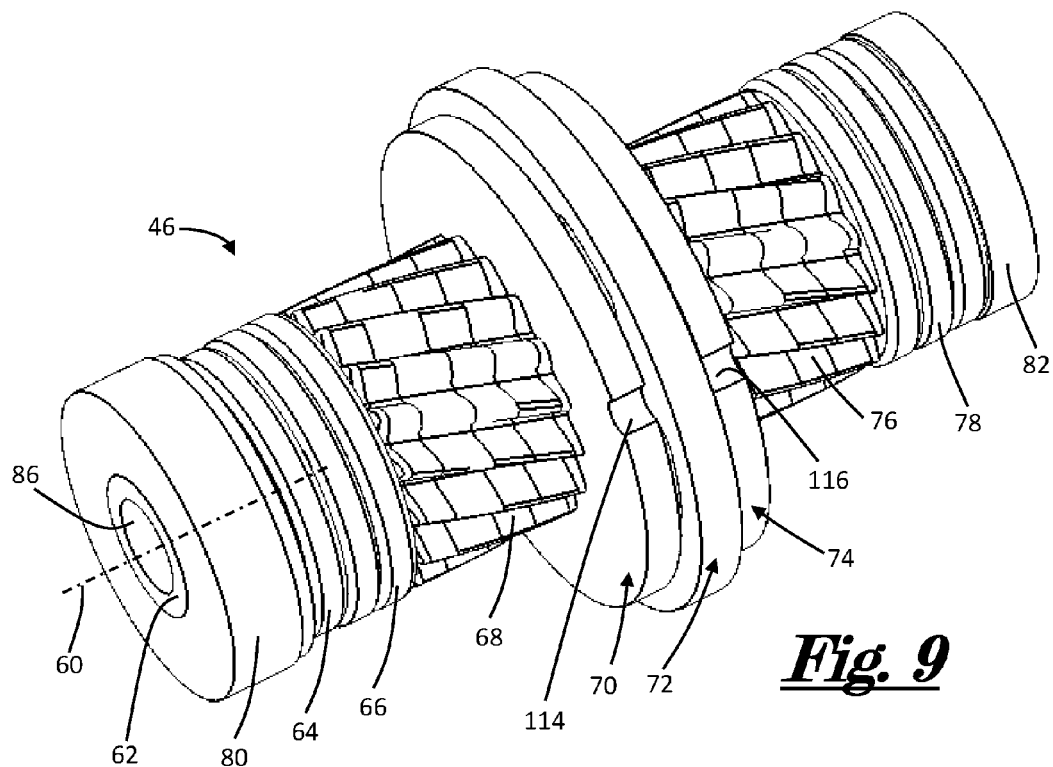
FIG. 9 is a perceptive view of another torque transferring assembly.

FIG. 9 illustrates another torque transferring assembly 46. This torque transferring assembly 46 comprises a common axle 62 supporting a spring 64, a thrust bearing 66, an output 68, a race 70, a spider 72 supporting a plurality of torque transferring elements 84 (See FIGS. 11-13), a race 74, an output 76, and a thrust bearing 78, all of which are supported on the axle 62 between two stoppers 80, 82. The axle 62, and the aforementioned components supported on the axle 62, are adapted to rotate about an axis 60, which is the same as the axis 60 about which the output shaft 58 of the motor 44 rotates (FIG. 2).

The axle 62 includes a bore 86 for receiving the output shaft 58 of the motor 44 (FIG. 3) such that rotation of the output shaft 58 causes the axle 62 to simultaneously rotate. However, the axle 62 may instead be the actual output shaft 58 of the motor 44 (FIG. 2) such that the aforementioned elements are supported directly on the output shaft 58 of the motor 44 versus on the axle 62. That is, the spring 64, thrust bearings 66 and 78, outputs 68 and 76, races 70 and 74, spider 72, and stoppers 80, 82 can all be installed or supported on the actual output shaft 58 of the motor 44.

Output 68 and race 70 are attached or installed on the axle 62 such that the output 68 and race 70 are able to rotate independently of the axle 62. However, the output 68 and race 70 are unable, are restricted, or are prevented from rotating independently of one another.

Similarly, output 76 and race 74 are attached or installed on the axle 62 such that the output 76 and race 74 are able to rotate independently of the axle 62. However, the output 76 and race 74 are unable, are restricted, or are prevented from rotating independently of one another.

The spider 72 is attached or rotationally fixed to the axle 62 such that spider 72 rotates with the axle 62; the spider 72 is unable to rotate independently of the axle 62. The spider 72 is also attached or axially fixed on the axle 62 such that the spider 72 is unable to axially move along a length of the axle 62, for example along axis 60.

Race 70 includes an alignment notch 114 and race 74 includes an alignment notch 116. The alignment notches 114, 116 are used during assembly of the torque transferring assembly to rotationally align the races 70, 74 relative to one another as well as to the torque transferring elements so that during the assembly of the torque transferring assembly, the initial position of the components is known. It is understood, however, that the races 70, 74 need not have these alignment notches 114, 116. Instead, the races 70, 74 can be rotationally aligned by other means, such as positioning the torque transferring elements either on one end or the other end of the spider pockets. Accurate assembly of the assembly 46 advantageously ensures minimal vibration during rotation at high speed when the torque transferring assembly 46 is mounted on the motor shaft.

The spring 64 is adapted to apply a preload on the thrust bearings 66, 78, the outputs 68, 76, the races 70, 74, the torque transferring elements 84, and the stoppers 80, 82. The axial preload by the spring 64 maintains the contact between the torque transferring elements 84 and the corresponding tracks 90,118 of the races 70, 74 that are illustrated in FIG. 4.

Each of the outputs 68, 76 are in communication with a corresponding spindle 38 of the corresponding rotary to linear stage mechanism 34, 36 (See FIG. 1) so that rotation of one or both of the outputs 68, 76 causes one or both of the corresponding spindles 38 to rotate.

Figure 10:
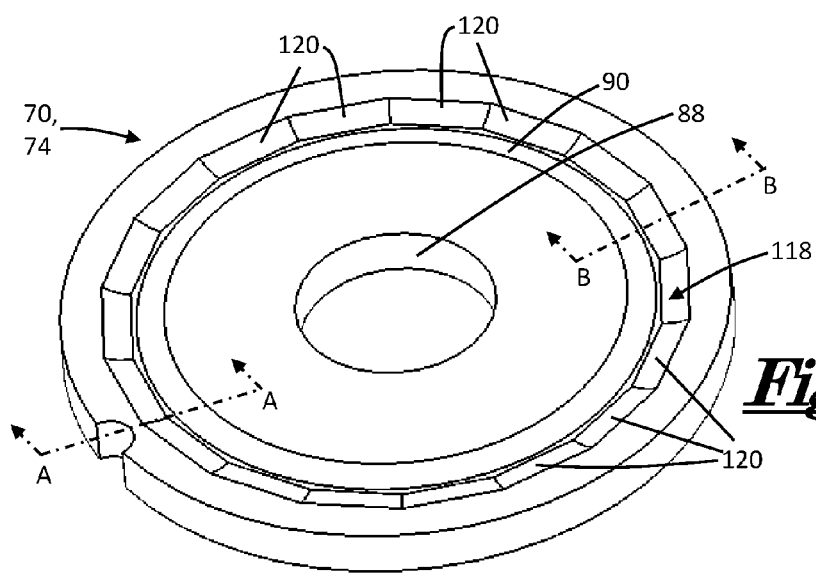
FIG. 10 is a perceptive view of a race of the torque transferring assembly of FIG. 9.

FIG. 10 illustrates the race 70, 74 of FIG. 9. The race 70, 74 includes an opening 88 for receiving the axle 62; a first annular track 90 disposed around the opening 88; and a second annular track 118 disposed around the opening 88. The first track 90 is substantially smooth. The second track 118 includes a plurality of adjacently located polygons, scallops, notches, grooves, detents, divots, edges, or other features 120 so that the second track 118 is not substantially smooth like the first track 90.

When the torque transferring assembly 46 is assembled, the torque transferring elements 84 can be positioned or located in either one of the tracks 90, 118. However, during apply of the service brake or the parking brake, the torque transferring elements 84 are moved or located in the smooth first track 90; and during release of the service brake or parking brake, the torque transferring elements 84 are located in or moved to the second track 118, or vice versa.

The first track 90, which is substantially smooth, provides for the torque transferring elements 84 to rotate or spin about their axis 110 (See FIG. 8c) when a load or torque acting on one of the outputs 68, 76 is greater than a load or torque acting on the other output 68, 76 so that the torque transfer assembly 46 functions similar to an open or unlocked differential where the outputs 68, 76 can rotate independently of each other and independently of the common axle 62 to move one or both brake pistons.

In contrast, the second track 118, which includes the polygon shape, scallops, notches, grooves, detents, divots, edges, or other features 120, captures the torque transferring elements 84 against the spider pocket or notches so that the torque transferring elements 84 do not rotate or spin about their axis 110, regardless if there is a difference in load or torque acting on one of the outputs 68, 76. In this regard, the torque transfer assembly 46 functions similar to a closed or locked differential where the outputs 68, 76 rotate together with the common axle 62 as a single, locked axle.

Figure 10A:
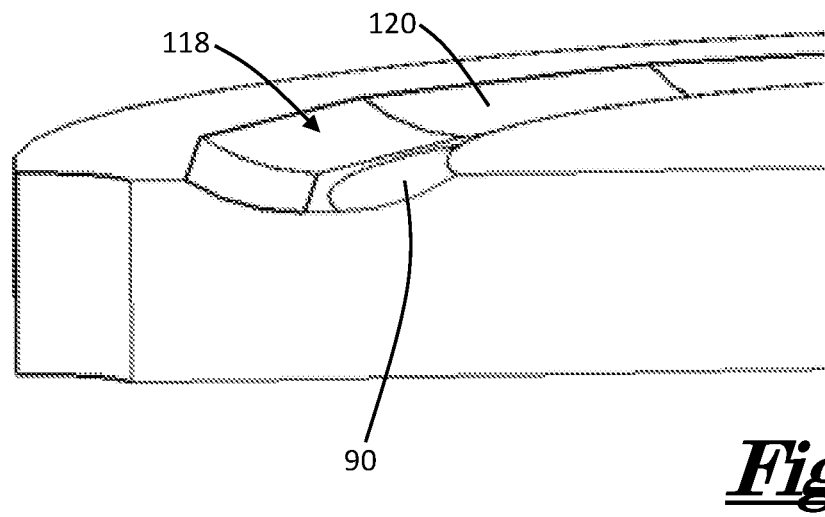
FIG. 10A is a section view taken along line A-A of FIG. 10.
Figure 10B:
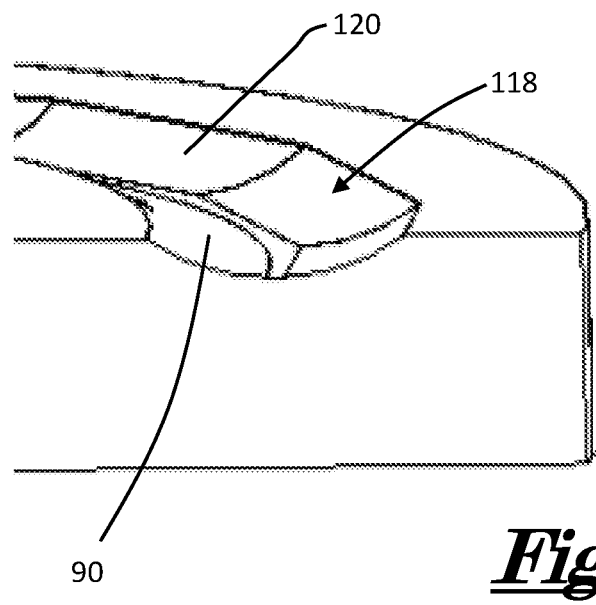
FIG. 10B is a section view taken along line B-B of FIG. 10.

FIGS. 10A and 10B each illustrate a section of the race 70, 74. FIG. 10A is a section of FIG. 10 taken along line A-A of FIG. 10, and FIG. 10B is a section of FIG. 10 taken along B-B. The smooth, inner track 90 is surrounded by the outer track 118, which includes the polygon shape, scallops, notches, grooves, detents, divots, edges, or other features 120, discussed above. The tracks 90, 118 are angled or sloped towards each other.

Figure 11:
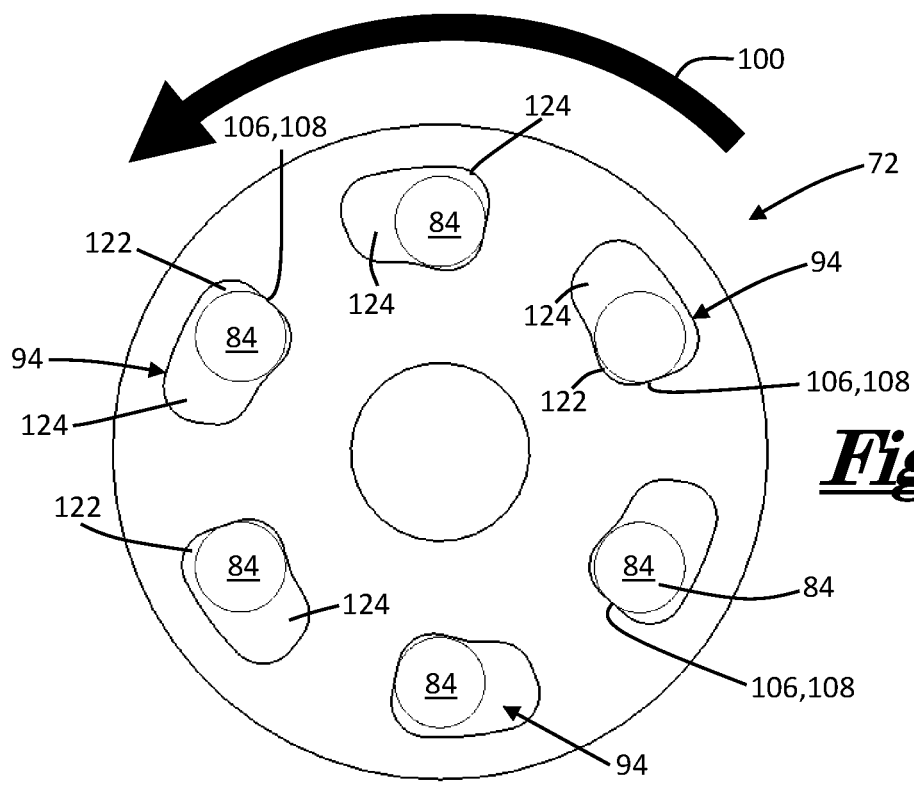
FIG. 11 is a front view of a spider of the torque transferring assembly of FIG. 9.
Figure 12:
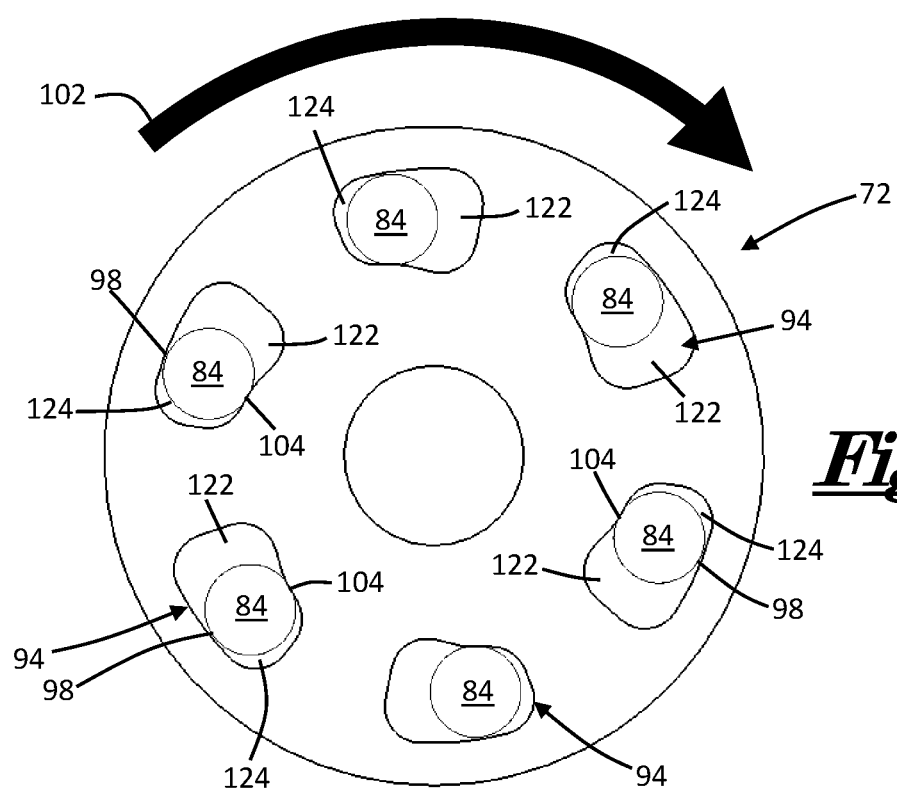
FIG. 12 is a front view of a spider of the torque transferring assembly of FIG. 9.

FIGS. 11 and 12 illustrate an exemplary spider 72 of the assembly of FIG. 9. The spider 72 includes a plurality of slots 94. Each slot 94 is adapted to support or contain a torque transferring element 84. Each slot 94 includes a first portion 122 and a second portion 124. As shown, the first portion 122 is larger than the second portion 124.

With specific reference to FIG. 11, during apply of the service brake or the parking brake, the spider 72 is rotated via the common axle 62 (FIG. 9) in the apply direction 100, during which time each of the torque transferring elements 84 are moved to corresponding first portions 122 of the slots 94. When the torque transferring elements 84 are in the first portions 122, the torque transferring elements 84 are loosely contained in the slots 94. When the torque transferring elements 84 are in the first portions 122, the torque transferring elements 84 are moved to, or are already in, the first track 90 of the races 70, 74 (FIG. 10). If the torque transferring elements 84 are in the second track 118, the shape of the slots 94 and/or rotation of the races 70, 74 will allow the bearings 84 to roll into the first track 90.

When rotated in the apply direction 100, only a contacting surface 108 of the first portion 122 contacts a tangent portion or equator 106 of the torque transferring element 84 located in that slot 94. Contact between the spider 72 and the torque transferring element 84 in only one location during the brake apply functions to allow the torque transferring elements 84 to rotate or spin about their axis 110, which functions to reduce the friction between the spider 72 and the torque transferring elements 84 so that the torque difference at each output 68, 76 is minimized. This helps ensure that when a load or resistance is acting on one of the outputs 68, 76, that output 68, 76 will slow or cease rotating, while the other output 68, 76 continues to rotate, or rotate faster than the common axle 62. This means that the torque transferring assembly 46 may function similar to an open or unlocked differential where the outputs 68, 76 rotate or cease rotating relative to the common axle 62 when amount of load or torque acting on each of the outputs 68, 76 is different.

With specific reference to FIG. 12, during release of the service brake or the parking brake, the spider 72 is rotated via the common axle 62 (FIG. 9) in the release direction 102, during which time the torque transferring elements 84 are moved to the second portions 124 of the slots 94. When the torque transferring elements 84 are in the second portions 124, the torque transferring elements 84 are tightly contained in the slots 94. When the torque transferring elements 84 are in the second portions 124, the torque transferring elements 84 are moved to, or already in, the second track 118 of the races 70, 74. If the torque transferring elements 84 are in the first track 90, the shape of the slots 94 and/or rotation of the races 70, 74 will allow the bearings 84 to roll into the second track 118.

During release of the service brake or the parking brake, opposing contacting surfaces 98 and 104 of the second portion 124 contact the torque transferring element 84 located in each slot 94. The torque transferring elements 84 are also trapped between the polygon features 120 in one race 70, 74 and the polygon features 120 in another race 70, 74 to prevent the torque transferring elements 84 from rotating or spinning about their axis 110. Contact between the spider 72 and the torque transferring element 84 in these locations during release of the service brake or the parking brake (as opposed to contact at one location during apply of the service brake or parking brake) functions to increase the friction or tangential load between the spider 72 and the torque transferring elements 84 so that the torque transferring elements 84 are restricted or prevented from rotating or spinning about their axis 110. This helps ensure the outputs 68, 76 rotate with the common axle without the outputs 68, 76 slowing or ceasing to rotate. This helps to ensure the outputs 68, 76 rotate together with the common axle 62 as a common, single locked axle, for example. This means that the torque transferring assembly 46 may function similar to a locked or closed differential where the outputs 68, 76 rotate with the common axle 62 regardless of the amount of load or torque acting on the outputs 68, 76.

Figure 13:
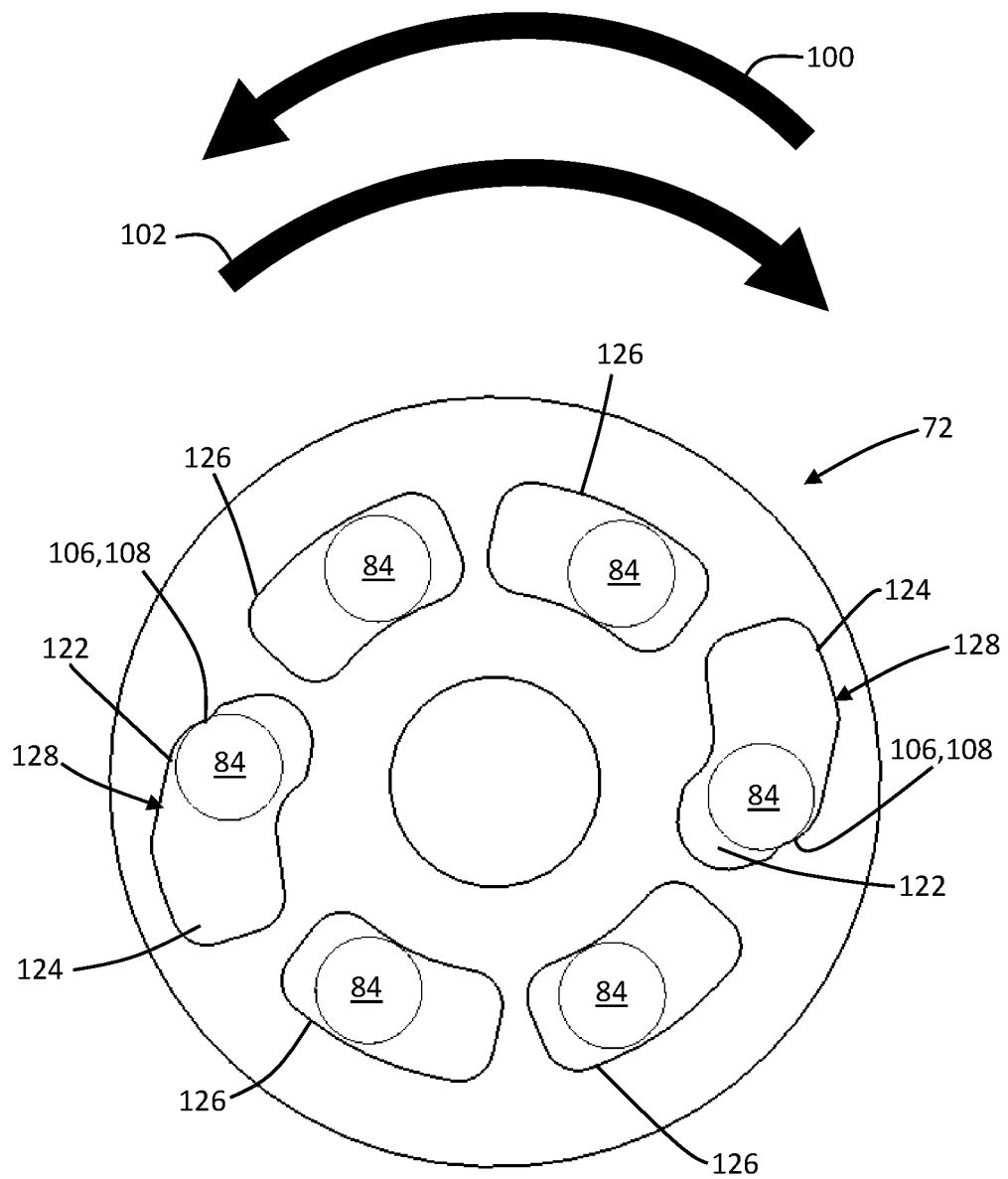
FIG. 13 is a front view of another spider of the torque transferring assembly of FIG. 9.

FIG. 13 illustrates another exemplary spider 72. The spider 72 includes a plurality of first slots 126 and a plurality of second slots 128, each of which are disposed between two adjacent first slots 16. Each slot 126,128 is adapted to contain a torque transferring element 84. Each of the second slots 128 include a first portion 122 and a second portion 124. The second slots 128 have a dog leg shape.

With continued reference to FIG. 13, during a service brake apply or a parking brake apply, the spider 72 is rotated via the common axle 62 in the apply direction 100. When the spider 72 is rotated in the apply direction 100, the torque transferring elements 84 in slots 128 are moved to the first portion 122 so that the torque transferring elements 84 are loosely contained therein. When the spider 72 is rotated in the apply direction 100, the torque transferring elements 84 are moved to, or are already in, the first track 90 of the races 70, 74. When the spider 72 is rotated in the apply direction 100, only a contacting surface 108 of the first portion 122 contacts a tangent portion or equator 106 of the torque transferring element 84 located in that slot 128. Contact between the spider 72 and the torque transferring element 84 in one location during a service brake apply or parking brake apply functions to allow those torque transferring elements 84 to rotate or spin about their axis 110, which functions to reduce the friction between the spider 72 and the torque transferring elements 84 so that the torque difference at each output 68, 76 is minimized. This helps ensure that when a load or resistance is acting on one of the outputs 68, 76, that output 68, 76 will slow or cease rotating, while the other output 68, 76 continues to rotate, or rotate faster than the common axle 62. This means that the torque transferring assembly 46 may function similar to an open or unlocked differential where the outputs 68, 76 rotate or cease rotating relative to the common axle 62 when amount of load or torque acting on each of the outputs 68, 76 is different.

With continued reference to FIG. 13, during release of the service brake or the parking brake, the spider 72 is rotated via the common axle 62 in the release direction 102, during which time the torque transferring elements 84 are moved to the second portions 124 of the slots 128. When the torque transferring elements 84 are in the second portions 124, the torque transferring elements 84 are tightly contained in the slots 128. When the spider 72 is rotated in the release direction 102, the torque transferring elements 84 are moved to, or are already in the second track 118 of the races 70, 74. When the spider 72 is rotated in the release direction 102, the slots 124, 126 contact the corresponding torque transferring element 84 in at least two locations. Contact between the spider 72 and the torque transferring elements 84 in at least two locations (as opposed to one location during a parking brake apply) increases the friction or tangential load between the spider 72 and the torque transferring elements 84 so that the torque transferring elements 84 are restricted or prevented from rotating or spinning about their axis 110. This helps ensure the outputs 68, 76 rotate with the common axle without the outputs 68, 76 slowing or ceasing to rotate. This helps to ensure the outputs 68, 76 rotate together with the common axle 62 as a common, single locked axle, for example. This means that the torque transferring assembly 46 may function similar to a locked or closed differential where the outputs 68, 76 rotate with the common axle 62 regardless of the amount of load or torque acting on the outputs 68, 76.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

By use of the term "may" herein, it is intended that any described attributes that "may" be included are optional.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A torque transferring assembly comprising:
   an axle;
   a first output;
   a second output; and
   a spider located in between the first output and the second output, the spider is adapted to support a plurality of torque transferring elements such that each of the torque transferring elements are in communication with one or both of the first output and the second output;
   wherein the torque transferring assembly is adapted to distribute a torque to both the first output and the second output so that both outputs rotate until a load or resistance acting on the first output becomes higher than a load or resistance acting on the second output, the torque transferring assembly is then adapted to distribute the torque to the second output so that the second output continues to rotate while the first output slows or ceases to rotate; and
   wherein the first output is adapted to rotate independently of the axle.

2. The torque transferring assembly according to claim 1, wherein the torque transferring assembly is adapted to distribute an opposite rotational direction torque to both the first output and the second output so that both outputs rotate together regardless of the load or resistance acting on the first output and/or the second output.

3. The torque transferring assembly according to claim 1, wherein the axle is adapted to support the first output, the second output, and the spider; and
   wherein the second output is adapted to rotate independently of the axle.

4. The torque transferring assembly according to claim 3, wherein the spider is rotationally fixed to the axle.

5. The torque transferring assembly according to claim 1, wherein the torque causes the axle to rotate about a longitudinal axis of the axle, which causes the spider and the torque transferring elements that are supported by the spider to rotate about the axis, the torque is distributed to the first output and the second output by way of the torque transferring elements rotating with the spider about the axis and being in contact with both of the first output and the second output.

6. The torque transferring assembly according to claim 1, wherein when the load or resistance acting on the first output becomes higher than the load or resistance acting on the second output, one or more of the torque transferring elements are adapted to spin about each of their respective axes, which causes the torque to be provided to the second output so that the second output continues to rotate while the first output slows or ceases to rotate.

7. The torque transferring assembly according to claim 1, wherein the torque is supplied to the torque transferring assembly by a motor; and
   wherein the axle comprises a bore, the bore is adapted to receive an output shaft of the motor.

8. The torque transferring assembly according to claim 1, wherein the torque is supplied to the torque transferring assembly by a motor; and
   wherein the axle is an output shaft of the motor.

9. The torque transferring assembly according to claim 5, wherein the torque transferring assembly comprises a spring, the spring is adapted to apply an axial preload on the torque transferring elements.

10. The torque transferring assembly according to claim 1, wherein the spider comprises a plurality of slots, each of the slots are adapted to support one of the torque transferring elements; and
    wherein one or more of the slots comprises a friction reducing element.

11. The torque transferring assembly according to claim 1, wherein the spider comprises a plurality of slots, each of the slots are adapted to support one of the torque transferring elements, the torque transferring elements are free to spin about their respective axis within each of the slots;
  wherein one or more of the slots comprises a friction reducing element, the friction reducing element is adapted to contact only a single portion of a corresponding torque transferring element when the torque transferring assembly distributes the torque to both the first output and the second output; and
  wherein the friction reducing elements are free from contacting the corresponding torque transferring elements when the torque transferring assembly distributes the opposite rotational direction torque to the first output and the second output.

12. The torque transferring assembly according to claim 10, wherein each of the slots are configured to contact the corresponding torque transferring element at two contact points.

13. The torque transferring assembly according to claim 10, wherein each of the slots are configured to contact the corresponding torque transferring element at three contact points.

14. The torque transferring assembly according to claim 11, wherein each of the slots are configured to contact the corresponding torque transferring element at two contact points.

15. A brake system comprising the torque transferring assembly according to claim 1, the brake system comprising a first brake piston, a second brake piston, and a brake pad;
  wherein rotation of the first output causes the first brake piston to move, and rotation of the second output causes the second brake piston to move; and
  wherein movement of the first and/or the second brake piston causes the brake pad to be moved towards or away from a brake rotor to create or release a clamping force.

16. A brake system comprising:
  a first brake piston;
  a second brake piston;
  a brake pad;
  a torque transferring assembly comprising: a first output, a second output, and a spider;
  an axle supporting the first output and the second output, the first output is adapted to rotate independently of the axle, and the second output is adapted to rotate independently of the axle; and
  a motor;
  wherein the spider is located in between the first output and the second output, the spider is adapted to support a plurality of torque transferring element such that each of the torque transferring elements are in contact with both of the first output and the second output;
  wherein the first brake piston is in communication with the first output, and the second brake piston is in communication with the second output;
  wherein the torque transferring assembly is adapted to distribute a first rotational direction torque supplied by the motor to both the first output and the second output so that both brake pistons move together until a load or resistance acting on the first brake piston becomes higher than a load or resistance acting on the second brake piston, the torque transferring assembly is then adapted to provide the first rotational direction torque to the second output so that the first output slows or ceases to rotate, while the second output continues to rotate so that the first brake piston slows or ceases to move, while the second brake piston continues to move; and
  wherein the torque transferring assembly is adapted to distribute a second rotational direction torque supplied by the motor to both the first output and the second output so that both outputs rotate together regardless of the load or resistance acting on the first brake piston or the second brake piston so that both the first brake piston and the second brake piston move.

17. The brake system according to claim 16, wherein a rotary to linear stage mechanism is located between each of the outputs and the brake pistons.

18. The torque transferring assembly according to claim 17, wherein the spider comprises one or more slots that are each adapted to support one of the torque transferring elements, each of the slots are configured to contact the corresponding torque transferring element at two contact points.

19. The brake system according to claim 18, wherein one or more of the slots comprises a friction reducing element.

20. The brake system according to claim 19, wherein the friction reducing elements are free from contacting the corresponding torque transferring elements when the torque transferring assembly distributes the opposite rotational direction torque to both the first output and the second output.

* * * * *